Oct. 7, 1924.  1,510,943

O. KJELSBERG

RESILIENT GEAR WHEEL

Filed April 10, 1924

Inventor:
Olaf Kjelsberg

Patented Oct. 7, 1924.

1,510,943

UNITED STATES PATENT OFFICE.

OLAF KJELSBERG, OF WINTERTHUR, SWITZERLAND.

RESILIENT GEAR WHEEL.

Application filed April 10, 1924. Serial No. 705,635.

*To all whom it may concern:*

Be it known that I, OLAF KJELSBERG, a citizen of the Republic of Switzerland, residing at Winterthur, Switzerland, have invented certain new and useful Improvements in Resilient Gear Wheels, of which the following is a specification, reference being had therein to the accompanying drawing.

The invention relates to improvements in resilient gear wheels. The resilient gear wheel according to the invention comprises a toothed rim rotatably mounted upon a wheel body, and plates turnably mounted and interposed between the toothed rim and the wheel body and helical springs arranged tangentially co-operating by means of caps, which limit at the same time the deflection of the springs, with said plates.

A constructional example of the subject matter of the invention is illustrated on the accompanying drawing, in which.

Figure 1:
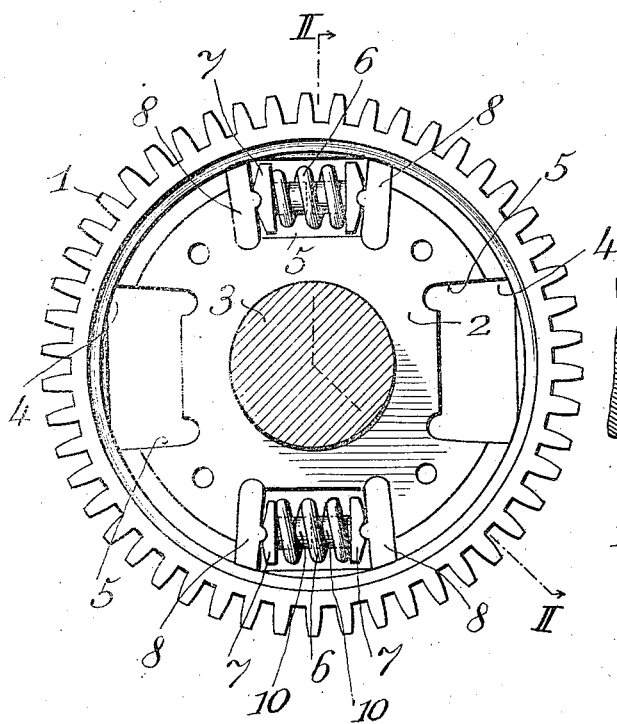
Fig. 1 is an end view of the gear wheel.
Figure 2:
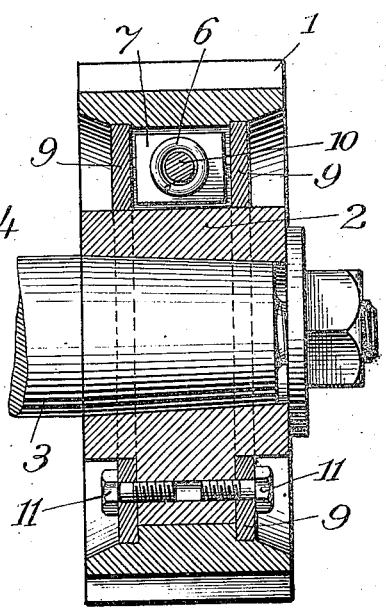
Fig. 2 is a section along line II—II of Fig. 1.

The toothed rim 1 of a pinion is rotatably mounted upon a wheel body 2 which is rigidly fixed to the shaft 3. The toothed rim 1 is provided with recesses 4 which register with recesses 5 of the wheel body 2. In the recesses 4 and 5 are inserted helical springs 6 bearing at their ends caps 7 resting against turnably mounted plates 8 which transmit the drive from the shaft 3 and the wheel body 2 respectively to the toothed rim 1. Stops facing each other are provided on the caps 7 for limiting the deflection of the springs. For instance, the caps 7 may be provided with inwardly facing central projections 10 located inside the helical springs 6.

The springs are brought into the position illustrated in the drawing with a certain initial compression. The toothed rim can be displaced relative to the wheel body whereby the plates 8 carry out turning movements about their inner edges under the influence of the torque which movements are counteracted by the compression springs 6 whereby the latter act as resilient transmission means. According to the power to be transmitted a plurality of helical springs may obviously be arranged either aside of each other or one inside the other.

The toothed rim 1 and the wheel body 2 are prevented from being laterally displaced relatively to each other by means of the covers or rings 9 which are screwed to the wheel body 2 by means of set screws 11.

The above described resilient gear wheel presents the advantage that the springs are completely enclosed and can be conveniently inspected after the cover has been removed and further the wheels can be cheaply manufactured.

I claim:

1. A resilient gear wheel comprising in combination a wheel body, a toothed rim rotatably mounted on said wheel body, a plurality of plates co-operating with said wheel body, and said toothed rim, helical springs tangentially arranged and co-operating with said plates, and caps interposed between said springs and said plates and provided with stops for limiting the deflection of said springs.

2. A resilient gear wheel comprising in combination a wheel body, a toothed rim rotatably mounted on said wheel body, said wheel body and said toothed rim being provided with recesses that register, a plurality of plates co-operating with said wheel body and said toothed rim, helical springs tangentially arranged and inserted in said recesses and co-operating with said plates, and caps interposed between said springs and said plates and provided with stops for limiting the deflection of said springs.

3. A resilient gear wheel comprising in combination a wheel body, a toothed rim rotatably mounted on said wheel body, a plurality of plates co-operating with said wheel body and said toothed rim, helical springs tangentially arranged and co-operating with said plates, and caps interposed between said springs and said plates, and inwardly facing central portions provided on said caps and located inside said helical springs for limiting the deflection of the latter.

4. A resilient gear wheel comprising in combination a wheel body, a toothed rim rotatably mounted on said wheel body, said wheel body and said toothed rim being provided with recesses that register, a plurality of plates turnably mounted about their inner edges in said wheel body and co-operating with said wheel body and said toothed rim, helical springs tangentially arranged and inserted in said recesses and co-operating with said plates, and caps interposed between said springs and said plates and provided with stops for limiting the deflection of said springs.

In testimony whereof I affix my signature.

OLAF KJELSBERG.